US005648757A

United States Patent [19]

Vernace et al.

[11] Patent Number: 5,648,757

[45] Date of Patent: Jul. 15, 1997

[54] REMOTE CONTROL PROTECTIVE HOLDER AND DETECTION DEVICE

[76] Inventors: Salvatore J. Vernace; Vincent Vernace, both of 890 Nafa Dr., Boca Raton, Fla. 33487; Giuseppe Lombardo, Via Bartolomeo Perestello 5, Palermo, Italy, 90151

[21] Appl. No.: 328,252

[22] Filed: Oct. 24, 1994

[51] Int. Cl.[6] .............................. G08B 1/08; H04N 5/44

[52] U.S. Cl. .................. 340/539; 340/573; 340/825.49; 340/825.36; 340/568; 348/180; 348/734; 206/305; 206/320

[58] Field of Search .................................. 340/539, 573, 340/825.49, 568, 825.36; 348/734, 180, 184; 206/305, 320; 229/198.2

[56] References Cited

U.S. PATENT DOCUMENTS

| | | | |
|---|---|---|---|
| 4,815,683 | 3/1989 | Ferrante | 248/309.1 |
| 4,848,609 | 7/1989 | Meghnot | 248/316.1 |
| 5,122,937 | 6/1992 | Stoudemire | 362/109 |
| 5,192,042 | 3/1993 | Wotring | 248/205.2 |
| 5,195,634 | 3/1993 | Zaug | 206/320 |
| 5,244,173 | 9/1993 | Kulyk | 248/176 |
| 5,294,915 | 3/1994 | Owen | 340/539 |

FOREIGN PATENT DOCUMENTS

| | | |
|---|---|---|
| 1-183297 | 7/1989 | Japan . |
| 3-126397 | 5/1991 | Japan . |

*Primary Examiner*—Donnie L. Crosland
*Attorney, Agent, or Firm*—McHale & Slavin, P.A.

[57] ABSTRACT

A remote control protection and detection holder. The holder secures a conventional remote control unit within a holder by employing elastic bands along the length of the holder allowing securement of various size remote control units. Enlarged corners are provided for protecting the remote controller from damage should it be dropped on a hard surface. Along one end of the holder is placed a fluorescent like material allowing the holder to glow in the dark. Electrical circuitry is provided which is made operational upon the holder being moved or whenever a television is started up by receipt of a predetermined electromagnetic field radiated from the horizontal deflection coils of the cathode-ray tube. A movable light source is provided for rotation over a key pad of a secured remote controller for illumination in low level lighting.

19 Claims, 3 Drawing Sheets

REMOTE CONTROL PROTECTIVE HOLDER AND DETECTION DEVICE

FIELD OF THE INVENTION

This present invention relates to remote control units for use with VCR's, TV's and the like and more particularly to a protective holder for remote control units having an integrated illumination and detection system.

BACKGROUND OF THE INVENTION

Present technology permits the remote activation of televisions, VCR's, stereos and so forth by use of a wireless controller capable of sending infrared signals for receipt by the unit to be operated. Control of such units can be placed in a small hand held remote control device that includes miniaturization of electrical circuitry by incorporating electronics into microprocessors providing lightweight and compact devices. A problem with remote control devices is that the miniaturization of circuitry and portability allows the device to be easily misplaced. For this reason, prior art teaches various techniques to prevent or locate a misplaced remote control device.

U.S. Pat. No. 5,294,915 discloses a means for locating a remote controller which is based upon a circuitry integrated into the remote control device responsive to an FM signal which will produce an audible alarm allowing the user to locate the device. A problem with the instant invention is the necessity of incorporating a receiver and related circuitry into the remote control device thus not addressing the millions of remote control units now in the marketplace which are sufficient for their needs making it wasteful to replace such units.

Another problem with the use of remote control units is that their portability makes them susceptible to damage should the controller be dropped. For instance, many homes have marble, ceramic, or hardwood flooring. If a conventional remote controller is dropped on the hard surface, the likely result is irreparable damage to the controller as the enclosure and micro-circuitry is not capable of withstanding impact against rigid objects. For this reason, numerous inventions disclose various protection devices which operate to enclose the remote control unit.

U.S. Pat. No. 5,195,634 discloses a remote control holder which assimilates that of a conventional VCR tape holding box. A remote control unit is placed within the box when it is not in use. The disclosure is based upon accepting a predetermined sized remote control device and by its operation requires the user to open the container in order to access the key pad of the controller. Thus, while a form of protection is provided to the remote control device, ease of accessibility is denied. The invention further discloses that by use of an enlarged enclosure it will be more difficult to misplace the remote control device.

U.S. Pat. No. 5,192,042 discloses a holder for VCR and TV remote control devices. Pursuant to this disclosure, two controllers can be coupled together in a back to back relationship within a holder having sidewalls that provide protection to the controllers should they be dropped. A Velcro type attachment is used to secure each controller in place. However, it is noted that should a holder be dropped it is unlikely that velcro attachment would be capable of preventing the controllers from dislodging and damage upon impact.

U.S. Pat. No. 5,244,173 discloses another holder for remote control units which operates as a stand for placement of controllers. The holder is stationary and allows removal of each control unit when desired. The holder does not provide protection to the controller when it is removed from the holder.

U.S. Pat. No. 4,848,609 discloses an adjustable holder for remote controllers. Various sized remote control units can be placed into the holder and multi holders adjoined thereto. The disclosure illustrates a fixed sized holder making it necessary to have a remote control unit of a predetermined size to fit within the holder. As noted by FIG. 1 of the disclosure, an odd size remote control unit results in a unsightly shaped holder with a side wall projecting outward.

U.S. Pat. No. 4,815,683 discloses yet another holder for remote control units which is simply a container that is secured to the side of a television or VCR. The remote controller must be replaced to the holder when not in use.

Still another problem with remote control units is the inability to read the remote control key pad in low lighting. U.S. Pat. No. 5,122,937 discloses one such illumination device. A remote controller is coupled to an illumination device wherein a movable light can be placed over the key pad. The light allows the user to illuminate the key pad during low lighting conditions for proper operation. The disclosure does not teach any form of protection of the remote control unit should it be moved nor does the invention disclose a means for detection of a misplaced remote control unit. None of the aforementioned patents describe protection of the device allowing accessibility to the controller as well as providing a means for detection of a misplaced remote control unit.

Thus, what is needed in the art is a remote control protective holder that is adjustable to any size controller, provides a means for locating a misplaced controller and provides a means for illumination of the key pad.

SUMMARY OF THE INVENTION

The instant invention is a combination protective holder and detection device having illumination capabilities for use in securing a remote control unit used for VCR's, TV's, stereos and the like devices. The protective holder consists of two pieces. An upper portion is placed along the top side surface of a conventional remote control unit, the ends of the device stretched over the side surface by use of an elastomer that provides adjustability to the length and width of the controller. A lower portion is positioned to the lower side of the remote control unit having similar longitudinal and width wise elastic capabilities. The upper and lower portions are coupled together providing a secure enclosure for the remote unit. The key pad of the remote control unit remains accessible as the holder only covers the side edges of the remote control unit.

Each corner of the device includes an enlarged bumper section. Two corners include illumination material that glows in the dark after being subjected to conventional light.

The opposite end of the device encompasses circuitry that allows for detection of the device should it be misplaced. The circuit is based on the detection of the electromagnetic field generated by the horizontal deflection coils of the cathode-ray tube of the TV set, this field has a fundamental component at the frequency of 15750 Hz in the USA, and a slightly lower value of 15625 Hz in Europe. If this circuit is placed within any object, for example the remote controller of the TV set itself, it can be used to easily locate the object, simply turning on the TV set, and hearing the acoustic signal emitted from the object. Should a remote controller be misplaced when it is coupled to the device, the start up of a television will cause the remote controller to alarm wherein the operator can easily locate the controller. In addition, there is movement detection circuitry that can be turned on so that if the controller is used in a situation such as a bedroom and it is misplaced between the sheets, simple movement of the bed will cause the controller to alarm allowing the user to easily locate the device.

A movable light is further provided for rotation over the surface of the key pad of the controller for use in low illumination circumstances.

Thus, an objective of the instant invention is to disclose the use of a remote control device that can be coupled onto a conventional remote controller without the need of integrating electronics into the circuitry.

Another objective of the instant invention is to provide a detection device that operates upon the detection of the electromagnetic field generated by the horizontal deflection coils of the cathode-ray tube of the TV set.

Yet another objective of the instant invention is to provide a detection device that operates upon movement of the controller.

Still another objective of the instant invention is to provide a protective holder having a full width and longitudinal length adjustment so as to be attachable to any size remote controller.

Another objective of the instant invention is to provide rubberized bumper cushions at each of the corners of a remote control unit so that if the controller is dropped there is suitable cushion so as to protect the controller.

Yet another objective of the instant invention is to provide a movable lamp that can be placed over the key pad during low lighting conditions to provide key pad illumination and can be stored so as to provide unrestricted access to the key pad.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Although the invention has been described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
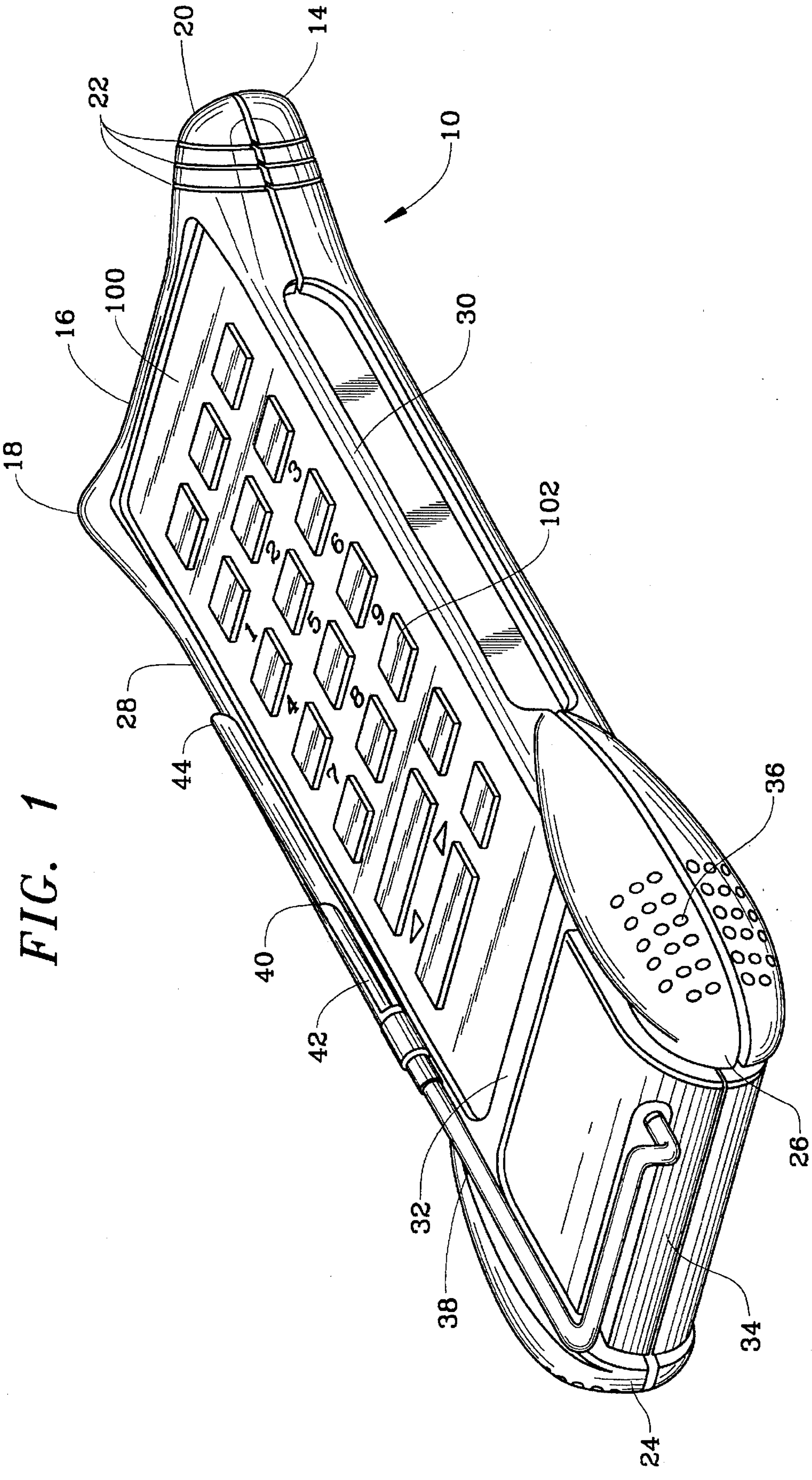
FIG. 1 is a perspective view of the instant invention with a remote control device placed in position.
Figure 2:
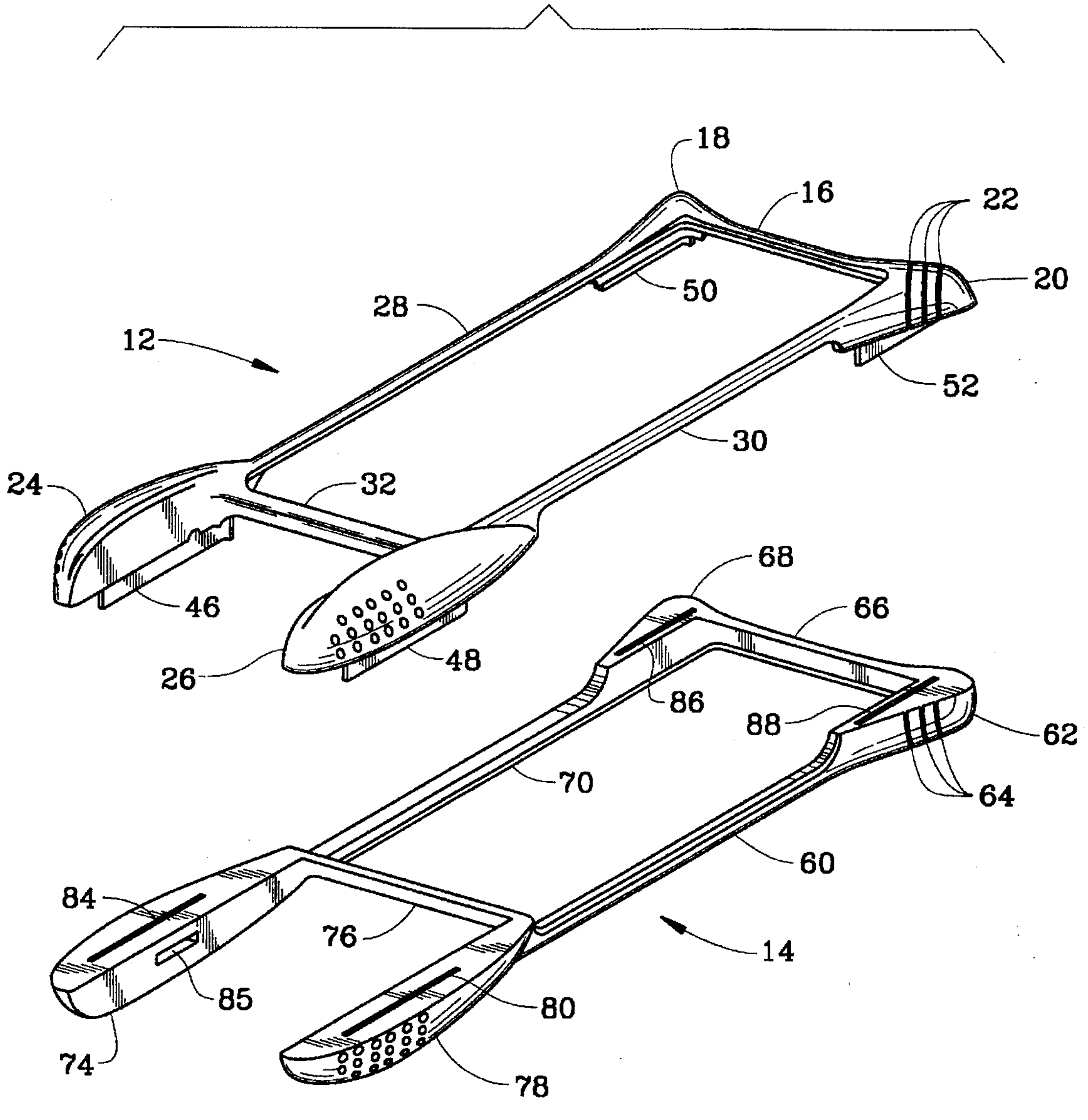
FIG. 2 is an exploded view of the instant invention without the electrical control box.
Figure 3:
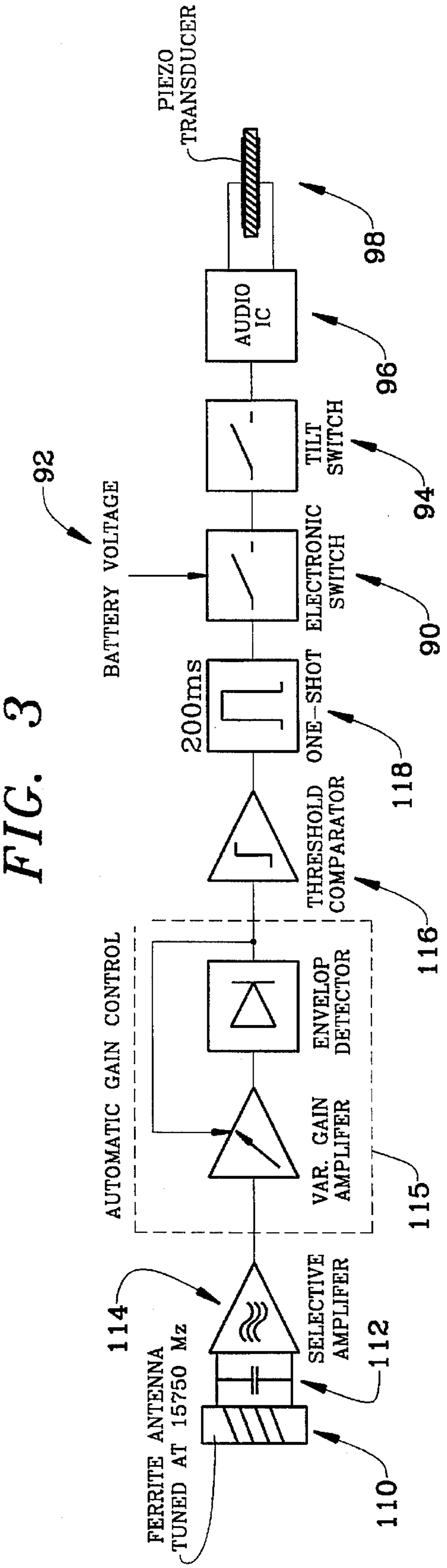
FIG. 3 is a block diagram of the detection mechanism for the instant invention.

Now referring to FIG. 1 shown is a perspective view of the protective holder of the instant invention 10 having a conventional remote control device 100 shown secured to the protective holder. The invention is a lightweight portable remote control holder for protection of a conventional remote controller and is based upon a support housing having an upper portion 12 and a lower portion 14. The upper portion 12 is defined by two parallel spaced apart side elastic edge bands 28 and 30 being generally co-extensive in length and integrally connected along one end by a first elastic end band 16 forming an enlarged corner 18 at one end of the band 28 and an enlarged corner 20 at one end of the band 30. A first elastic cross band 32 is positioned a predetermined distance from an opposite end of the upper side edge bands 28 and 30 forming a generally rectangular support conforming to the top edges of a remote controller with the opposite ends having enlarged ends 24 and 26.

The lower portion 14 is defined by two parallel spaced apart elastic side edge bands 60 and 70 being generally coextensive in length and integrally connected along one end by a second elastic end band 66 forming an enlarged corner 68 at the end of side edge band 70 and an enlarged corner 62 at the end of side edge band 60. A second elastic cross band 76 is positioned a predetermined distance from the opposite end of the lower side edge bands, the bands forming a generally rectangular support conforming to the top edges of a remote controller. The opposite end of side edge band 70 has an enlarged end 74 extending outwardly from the cross band 76 providing support for an electrical circuitry box 34 containing a locating detection device, further described later in this specification, and a second enlarged end 78 extending outwardly from cross side edge band 60 from the cross band 76. The protective holder is constructed of foam rubber or the like elastic material that secures to a controller placement between upper body portion 12 and lower body portion 14 using a means for locking the two portions together thereby securing the controller therebetween.

The enlarged ends are coupled together to form bumpers by coupling ends 18 and 68, 20 and 62, 24 and 74, and 26 and 78. Coupling tabs 46 and 48 are integrated into one set of bumpers 24 and 26 with coupling tabs 50 and 52 integrated into the other set of bumpers 20 which are operatively associated with reciprocal slots 80, 84 and 86, 88 located on the lower portion wherein the juxtaposition of the upper portion 12 to the lower portion 14 allows the interlocking of the tabs in a secure manner such that if the remote control unit is dropped the two portions will remain joined for the protection of the controller as well as securing therebetween the detection mechanism 34 by engagement of slot 85 on bumper 74 and a reciprocal slot on bumper 78, not shown. The end bumpers, as illustrated by 20 and 62 include slots wherein a fluorescent illumination material is contained allowing the ends to glow in the dark after being submitted to light.

The remote control unit further includes the use of a movable lamp 38 that is rotatable along one end of the detection device 34 and has an elongated shade 40 for securement of lamp 42 allowing the light to be rotated over the key pad 102 of the remote control unit 100 allowing correct depression of the key pad keys and low illumination conditions.

The circuitry consists of a sensor for detecting when the remote control unit is tipped over wherein an alarm is initiated sounding through speaker grills 36. For instance, in the movement sensing mode, should the remote controller with the instant invention be used in a bedroom, if the user is unable to find the remote control unit simply moving of the sheets or shaking of the bed will cause the remote control unit to signal its presence so that the user can easily locate the device. The unit further prevents accidental concealment of the remote control unit for when a couch pillow is moved and somebody sits upon a couch the controller will signal its presence so as to prevent the controller from slipping down between the pillows. As described later in the specification another means for detection of the device is provided within the detection enclosure 34 wherein turning on of a television system causes an electromagnetic field to radiate a signal to the device.

The remote control holder of the instant invention includes an antenna for reception of the signal frequency causing an indicator alarm to sound through the speaker grill 36 allowing the user to detect the location of the device. For example, when the user of a television system intends to locate the remote control unit, the user simply needs to turn on the television set wherein the electromagnetic signal will reach the remote control unit causing the initial burst of sound and provide for ease of location to the device.

Figure 4:
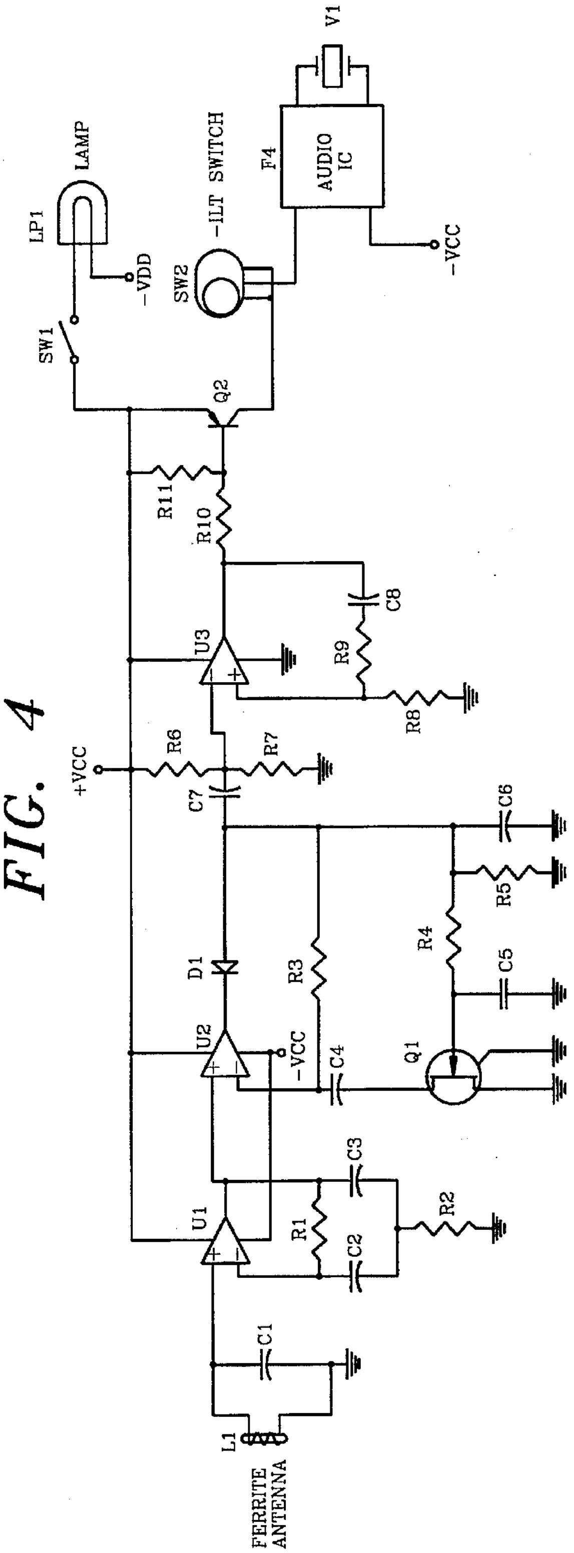
FIG. 4 is an electrical diagram of the circuitry.

FIG. 4 is a block diagram of the T.V. detector unit. The detection unit is made operable by an on /off switch 90 having a battery power supply 92. A tilt switch 94, such as a mercury switch, senses the movement of the device by temporarily opening the circuit to the audio IC 96 causing the piezo transducer 98 to sound.

The system further provides detection of the electromagnetic field by receipt of the signal by antenna 110, coupled to a capacitor 112 forming a resonant circuit. The fundamental frequency of the radiated field is amplified by a band-pass amplifier 114. The signal is further filtered by a Junction Field Effect Transistor 115. The incoming signal is peak detected and a monostable multivibrator 116 is used to supply an output of a positive pulse of almost constant duration 118 temporarily opening the circuit to the audio IC 96, and causing the piezo transducer 98 to sound.

In operation, when the user determines that the remote control device has been misplaced or lost the user has the option of moving different areas that may hold the controller such as a couch or, bedding material and the like thereby causing the movement of the invention resulting in the sounding of the alarm. Alternatively, the user can simply turn off and then turn on the television set thereby allowing it to send out a burst of energy through radio frequency transmission wherein the antenna located within the detector box 34 will receive the signal and amplify it accordingly to energize the audio integrated circuit 66.

Now referring to FIG. 4, the electronic circuit is shown that able to detect the presence of an operating TV set within a distance of several meters, emitting an acoustic signal every time the TV set is turned on. The circuit is based on the detection of the electromagnetic field generated by the horizontal deflection coils of the cathode-ray tube of the TV set. This field has a fundamental component at the frequency of 5750 Hz in the USA, and a slightly lower value of 15625 Hz in Europe. If this circuit is placed within any object, for example the remote controller of the TV set itself, it can be used to easily locate the object by simply turning on the TV set, and hearing the acoustic signal emitted from the object.

The electronic circuit can be integrated with other sensing devices, for example a position-sensitive switch and acoustic-responsive unit, in order to allow the location of the attached object in response to different kinds of stimuli.

The operation of the circuit is explained with reference to the enclosed diagram. The electromagnetic field radiated from the horizontal deflection coils of the cathode-ray tube of the TV set is detected by an antenna LI, formed by a small ferrite rod with a copper wire winding, that together with capacitor CI forms a resonant circuit tuned at the fundamental frequency of the radiated field, i.e. 15750 Hz. The signal is amplified by a band-pass amplifier, made by an operational amplifier UI with a frequency selective network (R1,R2,C2,C3) on the feedback path. The overall bandwidth of the receiver (tuned antenna and selective amplifier) is small enough to reject unwanted signals and noise, but wide enough to guarantee the correct operation of the circuit even for the slightly different frequency used in Europe (15625 Hz). The unit is adjustable between 15500 Hz and 16000 Hz for matching the appropriate television output. The signal is further amplified by the operational amplifier U2 that, together with the diode D1 and the network comprising the JFET (Junction Field Effect Transistor) Q1, performs the function of AGC (Automatic Gain Control): the incoming signal is peak detected, on the negative half-cycle, by D1,C6,Rf, and the negative voltage developing across C6 is applied, smoothed and delayed by R4,C5, to the gate of Q1. The higher the signal received, the more negative is the voltage at the gate of Q1, and the higher the small-signal resistance between the drain and source terminals of Q1. This and this decreases the voltage gain of the amplifier, defined by the attenuation of the voltage divider formed by R3 and the small-signal resistance between the drain and source terminals of Q1. This kind of operation tends to maintain an almost constant negative voltage at the anode of D1 for a wide variation of detected signal; however, when a nearby TV set is turned on, a sudden increase of this negative voltage is experienced, since it takes some time (delay from R4,C5) for the AGC control network to recover to a steady-state condition. The negative going voltage spike is applied through the capacitor C7 to the negative input of a comparator U3, which is biased at a slightly positive voltage, with respect to ground and the positive input, by the two resistors R6 and R7; if the amplitude of the negative spike exceeds this offset, the comparator U3 switches its output from the normally low level to a high level, and maintains this status even when the input spike is ended, due to the positive feedback of the network C8,R8,R9, thus performing the function of monostable multivibrator, supplying at the output a positive pulse of almost constant duration, for example 200 ms. This pulse turns off the PNP transistor Q2, and interrupts for a short time the power supply to the audio integrated circuit U4. This is a commercially available IC that, every time it is powered again, drives a piezoelectric transducer Y1 to emit a short audible tone (or even a simple tune). Thus every time that a TV set is turned on, the piezoelectric transducer emits an audible tone, according to the one stored in the audio IC. This kind of audio IC is usually able to start the emission of the recorded sound wave with a frequency corresponding to the resonant frequency of the piezoelectric transducer itself, thus adding another way to locate the unit. Since the circuit described operates by detecting the fast variation of the electromagnetic field radiated from the TV set, it can perform in a satisfactory way with high sensitivity even if a relatively high level of radiation is existing before the TV set is turned on, say from example from surroundings apartments.

In the accompanying circuit diagram, is also shown is a tilt switch, for example a mercury switch, that normally maintains a closed circuit between the transistor Q2 and the audio IC U4. But, if it experiences a substantial shock, the switch temporarily opens the circuit, thus causing, again at the subsequent closure, the sound emission. All the disclosed circuits can be powered by batteries.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A lightweight portable remote control holder for protection of a conventional remote controller having top and bottom edges separated by a thickness, said holder comprising: a support housing having an upper portion and a lower portion, said upper portion defined by two parallel spaced apart upper side edge bands being generally co-extensive in length, each having a first end and an opposite end, with said upper side edge bands integrally connected along said first end by a first end band and a first cross band positioned a predetermined distance from said opposite end of said upper side edge bands thereby forming a generally rectangular support conforming to said top edges of a remote controller, said lower portion defined by two parallel spaced apart lower side edge bands being generally co-extensive in length, each having a first end and an opposite end, with said lower side edge bands integrally connected along said first end by a second end band and a second cross band positioned a predetermined distance from said opposite end of said lower side edge bands thereby forming a generally rectangular support conforming to said bottom edges of a remote controller; means for locking said upper portion to said lower portion for securing the remote controller therebetween; and a detection means for locating said remote controller having a self contained energy source coupled to said support housing.

2. The holder according to claim 1 wherein said upper and lower side edge bands are constructed from an elastic rubber material allowing said holder to expand in length to accommodate a long remote controller.

3. The holder according to claim 1 wherein said first and second end bands and said first and second cross bands of said upper and lower portions are constructed from an elastic rubber allowing said holder to expand in width to accommodate a wide remote controller.

4. The holder according to claim 1 wherein said first ends and said opposite ends of said upper and lower side edge bands are enlarged to form bumpers of impact resistant material.

5. The holder according to claim 4 wherein at least two of said bumpers includes a fluorescent illumination material.

6. The holder according to claim 1 wherein said upper and lower portions are constructed from a material having illumination qualities.

7. The holder according to claim 1 wherein said means for locking include asymmetrical tabs positioned at each end of said side upper and lower side edge bands to accommodate said thickness of a majority of commercially available remote control units.

8. The holder according to claim 1 wherein said means for detection is further defined as an electrical circuit for selectively receiving an electromagnetic field transmitted by a conventional television, said electrical circuit having a means for generating an audio signal upon receipt of said field.

9. The holder according to claim 8 wherein said means for generating an audio signal is a piezo transducer.

10. The holder according to claim 8 wherein said means for receiving includes an antenna formed from a ferrite rod wrapped with copper winding electrically coupled to a capacitor tuned to receive at a frequency between 15500 Hz and 16000 Hz.

11. The holder according to claim 1 including an illumination system operatively associated with said detection means for locating said remote controller, said illumination system comprising: a rigid neck having a first end and a distal second end, said first end rotatably coupled to said detection means and said distal end available for extending over a key pad of a conventional remote control unit set within said support housing, said distal end including a light source operable by said energy source.

12. The holder according to claim 11 wherein said illumination system includes an electrical switch connected between said energy source and said light source for manual operation thereof.

13. The holder according to claim 11 wherein said means for detection includes an electrical circuit for sensing movement of said support housing.

14. A lightweight portable remote control holder for protection of a conventional remote controller having top and bottom edges separated by a thickness, said holder comprising: a support housing having an upper portion and a lower portion, said upper portion defined by two parallel spaced apart elastic upper side edge bands being generally co-extensive in length, said upper side edge bands integrally connected along one end by a first elastic end band creating an enlarged corner along said end, and a first elastic cross band positioned a predetermined distance from an opposite end of said upper side edge bands thereby forming a generally rectangular support conforming to the top edges of a remote controller with said opposite ends having enlarged ends, said lower portion defined by two parallel spaced apart elastic lower side edge bands being generally co-extensive in length, with said lower side edge bands integrally connected along one end by a second elastic end band forming an enlarged corner and a second elastic cross band positioned a predetermined distance from an opposite end of said lower side edge bands forming a generally rectangular support conforming to the bottom edges of a remote controller with said opposite ends having enlarged ends; means for locking said upper portion to said lower portion for securing the remote controller therebetween; and a detection system having a detection means with an electrical circuit for selectively receiving an electromagnetic field radiated from a cathode-ray tube of a conventional television, said electrical circuit having a means for generating an audio signal upon receipt of said field.

15. The holder according to claim 14 including an illumination system operatively associated with said detector system comprising: a rigid neck having a first end and a distal second end, said first end rotatably coupled to said detection means and said distal end available for extending over a key pad of a conventional remote control unit set within said support housing, said distal end including a light source operable by said energy source.

16. The holder according to claim 14 wherein said means for detection includes an electrical circuit for sensing movement of said support housing electrically coupled to said audio output.

17. A remote control detection device for incorporation with a remote control device comprising: a first means for producing a first signal by selectively receiving an electromagnetic field transmitted by a conventional television; a means for amplifying said first signal; a second means for producing a second signal by sensing motion of said remote control device; a means for generating an audio signal based upon said first and second signals.

18. The detection device according to claim 17 wherein said means for generating an audio signal is further defined as a piezo transducer.

19. The detection device according to claim 17 wherein said first means includes an antenna formed from a ferrite rod wrapped with copper winding electrically coupled to a capacitor tuned to receive at a frequency between 15500 Hz and 16000 Hz.

* * * * *